(12) United States Patent
Naka (10) Patent No.: US 9,350,935 B2
(45) Date of Patent: May 24, 2016

(54) MOVING IMAGE DATA RECORDING APPARATUS

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/362,333

(22) Filed: Jan. 31, 2012

(65) Prior Publication Data

US 2012/0194702 A1 Aug. 2, 2012

(30) Foreign Application Priority Data

Feb. 2, 2011 (JP) ................................ 2011-020643

(51) Int. Cl.
| | |
|---|---|
| *H04N 5/225* | (2006.01) |
| *H04N 5/77* | (2006.01) |
| *H04N 5/907* | (2006.01) |
| *H04N 9/804* | (2006.01) |
| *H04N 9/82* | (2006.01) |

(52) U.S. Cl.
CPC .............. *H04N 5/772* (2013.01); *H04N 5/907* (2013.01); *H04N 9/8042* (2013.01); *H04N 9/8211* (2013.01)

(58) Field of Classification Search
None
See application file for complete search history.

(56) References Cited

U.S. PATENT DOCUMENTS

| 5,808,664 | A * | 9/1998 | Yamashita | ............... H04N 3/36 348/42 |
| 8,648,925 | B2 * | 2/2014 | Hatanaka | ................... 348/220.1 |
| 2002/0005908 | A1 * | 1/2002 | Taka | ............................. 348/372 |
| 2002/0140826 | A1 * | 10/2002 | Sato et al. | .................. 348/222.1 |
| 2003/0189647 | A1 * | 10/2003 | Kang | ........................ 348/207.99 |
| 2004/0160525 | A1 * | 8/2004 | Kingetsu et al. | ............... 348/364 |
| 2006/0066742 | A1 * | 3/2006 | Miyata | ..................... 348/333.01 |
| 2006/0132615 | A1 * | 6/2006 | Imai et al. | ................ 348/208.99 |
| 2006/0215041 | A1 * | 9/2006 | Kobayashi | .................. 348/220.1 |
| 2007/0136078 | A1 * | 6/2007 | Plante | .............................. 705/1 |
| 2010/0225784 | A1 * | 9/2010 | Sato et al. | ................ 348/231.99 |
| 2011/0063440 | A1 * | 3/2011 | Neustaedter et al. | ......... 348/143 |
| 2011/0164147 | A1 * | 7/2011 | Takahashi et al. | ........ 348/231.99 |
| 2012/0008923 | A1 * | 1/2012 | Kasai | ................... G11B 27/034 386/343 |
| 2012/0075464 | A1 * | 3/2012 | Derenne et al. | ............... 348/135 |
| 2012/0169897 | A1 * | 7/2012 | Karn et al. | ................. 348/231.2 |

(Continued)

FOREIGN PATENT DOCUMENTS

| JP | 2002300445 A | * | 10/2002 | ............. H04N 5/225 |
| JP | 2010-130097 A | | 6/2010 | |
| JP | 2010130097 A | * | 6/2010 | |

OTHER PUBLICATIONS

Title: Translation of JP2010-1370097 Date: Jun. 2010 Author: Kano.*

(Continued)

*Primary Examiner* — Twyler Haskins
*Assistant Examiner* — Wesley J Chiu
(74) *Attorney, Agent, or Firm* — Canon U.S.A., Inc. IP Division (57) ABSTRACT

In response to an input of a recording instruction, a recorder is controlled to record on a recording medium moving image data of a predetermined time length before the recording instruction is input among the moving image data temporarily stored in a memory, and in response to that a predetermined condition is determined to be satisfied before the recording instruction is input, the recording unit is controlled not to record on the recording medium the moving image data stored in the memory before the predetermined condition is determined to be satisfied.

11 Claims, 5 Drawing Sheets

(56) References Cited

U.S. PATENT DOCUMENTS

2013/0163947 A1* 6/2013 O'Neill .................. H04N 5/772
   386/227
2013/0223810 A9* 8/2013 Simmons et al. ............. 386/224

OTHER PUBLICATIONS

Title: Translation of JP2002300445A Date: Oct. 2002 Author: Kitagawa.*

* cited by examiner

MOVING IMAGE DATA RECORDING APPARATUS

BACKGROUND OF THE INVENTION

1. Field of the Invention

The present invention relates to a moving image data recording apparatus.

2. Description of the Related Art

Conventionally, an imaging apparatus is known as a moving image data recording apparatus. The imaging apparatus is provided with functions of generating moving image data from a captured image and recording the moving image data on a recording medium such as a memory card. Such an imaging apparatus have appeared in recent years. For example, Japanese Patent Application Laid-Open No. 2010-130097 discusses an imaging apparatus capable of acquiring moving image data in advance and temporarily storing the moving image data in a memory before a user inputs a recording instruction and, when the user inputs the recording instruction, recording the moving image data acquired in advance.

However, with the imaging apparatus discussed in Japanese Patent Application Laid-Open No. 2010-130097, moving image data temporarily stored in the memory before the user inputs the recording instruction may include the one unsuitable for recording if the user rotates a camera or applies an excessive vibration to the camera during image angle adjustment. Generally, a moving image for a predetermined time length in seconds is temporarily stored in the memory. Therefore, if the user inputs the recording instruction after waiting for at least the predetermined time length in seconds, moving image data unsuitable for recording will not be recorded. However, if the user inputs the recording instruction without waiting for the predetermined time length, moving image data unsuitable for recording will be recorded.

SUMMARY OF THE INVENTION

The present invention relates to an imaging apparatus capable of acquiring moving image data in advance and temporarily storing the moving image data in a memory before a user inputs a recording instruction and, when the user inputs the recording instruction, recording the moving image data acquired in advance. More specifically, the present invention relates to a moving image data recording apparatus capable of determining a situation where moving image data unsuitable for recording is recorded and discarding the temporarily stored moving image data, thus preventing the moving image data unsuitable for recording from being recorded on a recording medium.

According to an aspect according to the present invention, a moving image data recording apparatus includes an acquisition unit configured to acquire moving image data, a memory configured to temporarily store the moving image data of at least a predetermined time length acquired by the acquisition unit, a recording unit configured to record on a recording medium the moving image data stored in the memory, a controller configured to, in response to an input of a recording instruction, control the recording unit to record on the recording medium the moving image data of the predetermined time length before the recording instruction is input among the moving image data temporarily stored in the memory, and a determination unit configured to determine whether a predetermined condition is satisfied, wherein, in response to that the predetermined condition is determined to be satisfied by the determination unit before the recording instruction is input, the controller controls the recording unit not to record on the recording medium the moving image data stored in the memory before the predetermined condition is determined to be satisfied.

According to the present invention, a moving image data recording apparatus can determine a situation where moving image data unsuitable for recording is recorded and discard temporarily stored moving image data, so that it can prevent the moving image data unsuitable for recording from being recorded on the recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment will be described below based on an imaging apparatus capable of capturing a moving image. In a regular "moving image shooting mode", the imaging apparatus according to the present exemplary embodiment can record moving image data pieces captured from the start to end of a single moving image shooting operation on a recording medium as one file.

In a regular "still image shooting mode", the imaging apparatus according to the present exemplary embodiment can record still image data pieces captured in response to one shooting instruction on the recording medium as one file.

Further, the imaging apparatus according to the present exemplary embodiment has a "movie digest mode". In the movie digest mode, in response to a still image shooting instruction, the imaging apparatus can record the moving image data of a predetermined time length, which is captured before the still image shooting instruction is input, on the recording medium as a moving image file in addition to recording of the captured still image data on the recording medium. The imaging apparatus temporarily stores the moving image data in a memory included therein.

In the "movie digest mode", the imaging apparatus according to the present exemplary embodiment can connect all moving image data pieces, for example, captured in the "movie digest mode" on the same date to generate one piece of moving image data, and record the resultant data on the recording medium. In this case, each time the still image shooting instruction is input, the imaging apparatus connects (adds) newly captured moving image data to the moving image data of the moving image file already recorded on the recording medium. If a moving image file captured in the "movie digest mode" on the same date is not recorded on the recording medium, the imaging apparatus records the moving image data as a new moving image file.

In the present exemplary embodiment, the "movie digest mode", the "moving image shooting mode", and the "still image shooting mode" may be referred to as a "first shooting mode", a "second shooting mode", and a "third shooting mode" respectively.

In particular, when the imaging apparatus according to the present exemplary embodiment enters the "movie digest mode", it generates encoded moving image data by using a plurality of images acquired by the imaging unit as images for respective frames of the moving image, and sequentially stores the encoded moving image data in the memory. If a specified time period or more has elapsed since the moving image data was stored in the memory, the imaging apparatus discards or overwrites the moving image data on the memory.

Then, in response to an input of the still image shooting instruction, the imaging apparatus generates still image data based on the image signal acquired by the imaging unit, and records the still image data on the recording medium. At that time, the imaging apparatus records on the recording medium as a moving image file the moving image data of the predetermined time length which has been stored in the memory. If a moving image file captured in the "movie digest mode" on the same date has already been recorded on the recording medium, the imaging apparatus connects the moving image data of the predetermined time length to the existing moving image file.

When the moving image data of the predetermined time length is connected to the moving image data of the moving image file that is already recorded on the recording medium (existing moving image file), the imaging apparatus first records on the recording medium the moving image data of the predetermined time length temporarily stored in the memory. Subsequently, the imaging apparatus analyzes the moving image data of the existing moving image file to identify a connecting position, and connects the moving image data. Thus, since the moving image data storage area in the memory is released without waiting for the end of analyzing the existing moving image file, the imaging apparatus according to the present exemplary embodiment can become ready for capturing next moving image data without waiting for a prolonged period of time.

The imaging apparatus according to the present exemplary embodiment uses a recording medium formatted according to a file system which records data based on a file allocation table (FAT). (In the present exemplary embodiment, a file system based on FAT32 is used.) When the above-described connection of the moving image data is performed, the imaging apparatus edits the file allocation table. Accordingly, connection (addition) and separation of moving images can be easily performed.

Further, when it is determined that any one of predetermined conditions is satisfied, the imaging apparatus according to the present exemplary embodiment discards the moving image data temporarily stored in the memory even if a still image recording instruction is not input. Accordingly, the imaging apparatus can avoid recording on the recording medium the moving image data which was acquired before any one of the predetermined conditions is determined to be satisfied even if the recording instruction is input. Furthermore, instead of discarding the moving image data, the imaging apparatus may not transfer the moving image data, which was acquired before any one of the predetermined conditions is determined to be satisfied, from the memory to the recording medium so as not to record the moving image data thereon when the recording instruction is input. Accordingly, the imaging apparatus according to the present exemplary embodiment can avoid recording moving image data unsuitable for recording on the recording medium.

Such an imaging apparatus will be described below.

Figure 1:
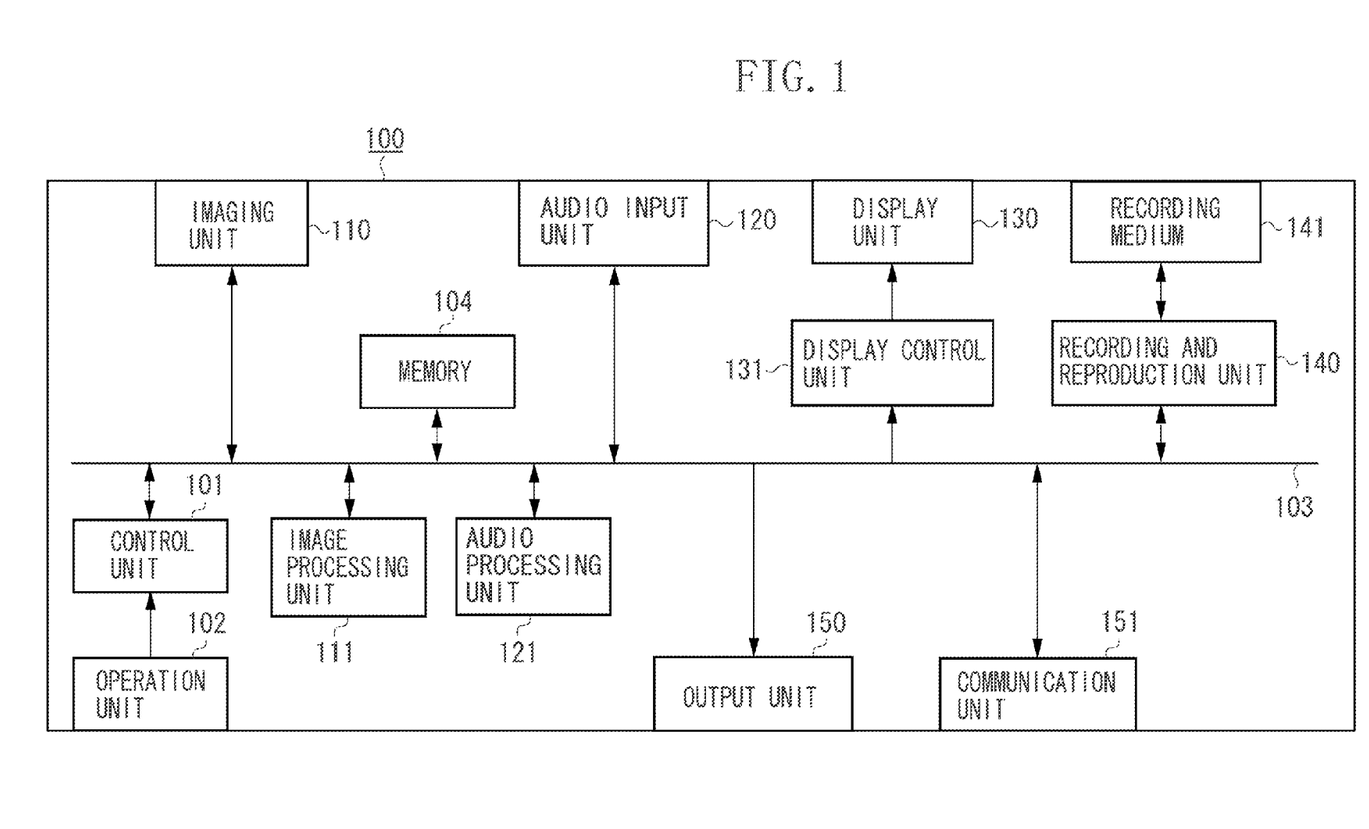
FIG. 1 illustrates a configuration of an imaging apparatus according to a first exemplary embodiment.

An entire configuration of an imaging apparatus 100 according to the present exemplary embodiment will be described below with reference to FIG. 1. Referring to FIG. 1, a control unit 101 includes, for example, a central processing unit (CPU) such as a microprocessor unit (MPU), and a memory such as a dynamic random access memory (DRAM), and a static random access memory (SRAM). In response to an operation signal from an operation unit 102 which accepts an operation by a user, the control unit 101 executes various operations (programs) to control each unit in the imaging apparatus 100 or data transfer between units. The control unit 101 may be a microcomputer including a CPU and a memory.

The operation unit 102 is provided with switches for inputting various operations related to image shooting, such as a power source button, a recording start button, a zoom adjustment button, and an auto-focusing button. The operation unit 102 is also provided with a menu display button, a determination button, cursor keys, a pointing device, and a touch panel. Each time the user operates these keys and buttons, the operation unit 102 transmits a relevant operation signal to the control unit 101.

A bus 103 is a general-purpose bus for transmitting various data pieces, control signals, and instruction signals to each unit in the imaging apparatus 100.

The imaging unit 110, while controlling a light quantity through a diaphragm, converts a subject's optical image captured through a lens into an analog image signal by an image sensor such as a charge-coupled device (CCD) sensor and a complementary metal-oxide semiconductor (CMOS) sensor. Then, the imaging unit 110 converts the analog image signal to a digital image signal and transmits the digital image signal to a memory 104 for temporary storage.

An image processing unit 111 performs processing required for image recording and reproduction. More specifically, the image processing unit 111 is a microcomputer which includes a program for executing the following operations. Further, the image processing unit 111 may execute the following operations as functions of the control unit 101. The image processing unit 111 applies image quality adjustment processing to the digital image signal acquired by the imaging unit 110 and then stored in the memory 104. In the image quality adjustment processing, the white balance, color, brightness, and the like are adjusted based on user-set setting values and setting values determined based on the image characteristics.

The image processing unit 111 further performs processing for generating moving image data based on image signals of a plurality of frames having undergone the image quality adjustment processing. The image processing unit 111 according to the present exemplary embodiment may generate compressed and encoded moving image data by applying intra-frame coding to each frame of the moving image data. In addition, the image processing unit 111 may generate compressed and encoded moving image data by utilizing a difference and motion prediction between a plurality of frames of the moving image data. For example, the image processing unit 111 can generate moving image data based on known compressing and encoding methods such as Motion Joint Photographic Experts Group (MotionJPEG), Moving Picture Experts Group (MPEG), and H.264 (MPEG4-Part10 AVC).

Generally, frame image data having undergone intra-frame coding is referred to as I picture. Image data having undergone intra-frame coding with using a difference from the preceding frame is referred to as P picture. Image data having undergone intra-frame coding with using differences from the preceding and following frames is referred to as B picture. The compression methods used in the image processing unit 111 are the known compression methods and not related to the features of the present invention, and therefore the descriptions of the compression methods will be omitted.

The image processing unit 111 can perform processing for generating still image data from the image signal having undergone the image quality adjustment processing. The image processing unit 111 uses the general compressing and encoding methods such as JPEG to generate still image data. The compressing and encoding methods used in the image processing unit 111 are the known compression methods and not related to the features of the present invention, and therefore the descriptions of the compressing and encoding methods will be omitted. The still image data may be RAW image data with which a digital image signal acquired by the imaging unit 110 is recorded as it is.

The moving image and still image data generated by the image processing unit 111 are stored in areas other than the above-described area storing the digital image signal in the memory 104. Although the present exemplary embodiment will be described below on the premise that the digital image signal acquired by the imaging unit 110 and the moving image and still image data generated by the image processing unit 111 are stored in the same memory 104, these data pieces may be stored in different memories.

An audio input unit 120 collects sound around the imaging apparatus 100 by, for example, a built-in non-directional microphone or an external microphone connected via an audio input terminal, converts the acquired analog audio signal to a digital image signal, and transmits the digital image signal to the memory 104 for temporary storage.

An audio processing unit 121 performs processing required for audio recording and reproduction. More specifically, the audio processing unit 121 is a microcomputer which includes a program for executing the following operations. Further, the audio processing unit 121 may execute the following operations as functions of the control unit 101. The audio processing unit 121 applies level optimization processing and noise reduction processing to the digital audio signal acquired by the audio input unit 120 and then stored in the memory 104. The audio processing unit 121 compresses the audio signal as required. The audio processing unit 121 uses generally known audio compression methods such as audio code number 3 (AC3) and advanced audio coding (AAC) which are not related to the features of the present invention, and therefore descriptions of the audio compression methods will be omitted.

The audio data generated by the audio processing unit 121 is stored in the memory 104 again.

A display control unit 131 is a microcomputer which controls image display on a display unit 130. More specifically, the display control unit 131 reads a digital image signal temporarily stored in the memory 104 and displays a relevant image on the display unit 130. The display unit 130 may be a liquid crystal panel or an organic electroluminescence (EL) panel mounted on the imaging apparatus 100 or a display device (a television, a monitor, a projector, etc.) different from the one of the imaging apparatus 100.

The control unit 101 reads moving image data and audio data stored, for example, in the memory 104, and transmits the moving image data and the audio data to the recording and reproduction unit 140. The recording and reproduction unit 140 records the transferred moving image data and audio data on a recording medium 141. The recording and reproduction unit 140 records the moving image data and the audio data on the recording medium 141 as one moving image file. In this case, the control unit 101 may generate various types of data indicating camera settings at the time of shooting and detected data, and record these generated data pieces together with the moving image data and the audio data on the recording medium 141.

The recording medium 141 may be a recording medium built in the imaging apparatus 100 or a removable recording medium. For example, the recording medium 141 includes all types of recording media such as a hard disk, an optical disc, a magneto-optical disk, a compact disc recordable (CD-R), a digital versatile disc recordable (DVD-R), a magnetic tape, a nonvolatile semiconductor memory, and a flash memory.

When recording a still image file, the control unit 101 reads the still image data stored in the memory 104 and transmits it to the recording and reproduction unit 140. The recording and reproduction unit 140 records the transmitted still image data on the recording medium 141 as a still image file.

The recording and reproduction unit 140 can also read (reproduce) the moving image file recorded on the recording medium 141. Then, the control unit 101 controls the recording and reproduction unit 140 to read, for example, header information of the moving image included in the read moving image file and, based on the header information, to read the moving image data and the audio data to be reproduced from the recording medium 141. The recording and reproduction unit 140 transmits the read moving image data to the image processing unit 111 and the reproduced audio data to the audio processing unit 121.

The image processing unit 111 sequentially stores an image of one frame of reproduced moving image data in the memory 104. Then, the display control unit 131 sequentially reads the image of one frame stored in the memory 104, and displays the read image on the display unit 130. In the meantime, the audio processing unit 121 decodes a digital audio signal from the reproduced audio data, converts the digital audio signal to an analog signal, and outputs the analog audio signal to an audio output unit (not illustrated) such as a speaker, an earphone terminal, and an audio output terminal.

When reproducing a still image, the recording and reproduction unit 140 reads (reproduces) a still image file recorded on the recording medium 141. Then, the control unit 101 transmits the still image data included in the read still image file to the image processing unit 111. The image processing unit 111 stores the image of the still image data in the memory 104. Then, the display control unit 131 sequentially reads an image of one frame stored in the memory 104, and displays the read image on the display unit 130.

An output unit 150 includes an audio terminal and a video terminal for outputting an audio signal and an image signal, respectively, to an external device. A communication unit 151 transmits and receives data to/from an external device via wired and wireless connections.

Although the imaging apparatus 100 according to the present exemplary embodiment records a moving image file, for example, in the "QuickTime (registered trademark) format", any file format can be used.

The present exemplary embodiment will be described below on the premise that the file management system of the recording medium 141 is based on the FAT file system generally used for built-in devices. Since the technique of the FAT file system itself is widely known, descriptions will be made only for characteristic operations of the present exemplary embodiment. Further, the new technology file system (NTFS) format and extended FAT (exFAT) format, which are FAT file formats, may be used.

The physical memory area in the recording medium 141, for example, a flash memory is managed by a built-in microcomputer of the imaging apparatus 100. With respect to an access from the recording and reproduction unit 140 of the imaging apparatus 100, the data pieces seem to be logically stored by the FAT file system.

As described above, the imaging apparatus 100 according to the present exemplary embodiment is provided with the "movie digest mode (first shooting mode)", the "moving image shooting mode (second shooting mode)", and the "still image shooting mode (third shooting mode)".

Regular operations performed by the imaging apparatus 100 according to the present exemplary embodiment will be described below.

With the imaging apparatus 100 according to the present exemplary embodiment, when a user operates the power button on the operation unit 102, the operation unit 102 issues an activation instruction to the control unit 101. In response to the activation instruction, the control unit 101 controls a power supply unit (not illustrated) to supply the power to each unit of the imaging apparatus 100.

When the power is supplied, the control unit 101 confirms, for example, the current mode setting of a mode selector switch on the operation unit 102, such as the "still image shooting mode", the "moving image shooting mode", the "reproduction mode", and the "digest movie mode", based on an instruction signal from the operation unit 102.

In the "still image shooting mode", the imaging apparatus 100 captures an image when the user operates a still image recording button on the operation unit 102 in the shooting standby state, and a still image file is recorded on the recording medium 141. Then, the imaging apparatus 100 returns to the shooting standby state.

In the "moving image shooting mode", the imaging apparatus 100 starts shooting when the user operates a moving image recording start button on the operation unit 102 in the shooting standby state. In the meantime, moving image data and audio data are recorded on the recording medium 141. When the user operates a moving image recording end button on the operation unit 102, the shooting ends, and the moving image data and the audio data recorded on the recording medium 141 are completed as a moving image file. Subsequently, the imaging apparatus 100 returns to the shooting standby state.

In the "reproduction mode", the imaging apparatus 100 reproduces from the recording medium 141 a still image file or a moving image file related to a file selected by the user to output the relevant still image, moving image, and sound. The "digest movie mode" will be described below.

First, the "still image shooting" mode will be described below. When the still image shooting mode is set on the operation unit 102, the control unit 101 first instructs each unit of the imaging apparatus 100 to enter the shooting standby state as described above.

In the shooting standby state, the display control unit 131 reads a digital image signal temporarily stored in the memory 104, and displays an image related to the read image signal on the display unit 130. The user can prepare for shooting while monitoring the image displayed on the screen in this way.

When the user operates the still image recording button on the operation unit 102 and a shooting instruction signal is transmitted in the shooting standby state, the control unit 101 transmits a shooting control signal to each unit of the imaging apparatus 100 to control each unit to perform the following operations.

The imaging unit 110 converts a subject's optical image captured through a lens into an analog image signal by an image sensor, converts the analog image signal to a digital image signal, and temporarily stores the digital image signal in the memory 104. The image processing unit 111 applies the image quality adjustment processing (adjustment of white balance, color, brightness, etc.) to the digital image signal stored in the memory 104 based on setting values. Then, the display control unit 131 reads the digital image signal processed by the image processing unit 111, and displays a relevant image on the display unit 130. The user can confirm the captured still image by monitoring the image displayed on the display unit 130.

Then, the image processing unit 111 reads the image signal temporarily stored in the memory 104, applies predetermined encoding processing to the image signal to generate still image data (still image acquisition), and outputs the still image data to the recording and reproduction unit 140. The recording and reproduction unit 140 writes the still image data to the recording medium 141 as a still image file under the control of a file system such as the universal disk format (UDF) and FAT.

Upon completion of the encoding operation by the image processing unit 111, the control unit 101 transmits a control signal to each unit of the imaging apparatus 100 to shift to the shooting standby state. Then, the imaging apparatus 100 returns to the shooting standby state.

The "moving image shooting mode" will be described below. When the moving image shooting mode is set on the operation unit 102, the control unit 101 first instructs each unit of the imaging apparatus 100 to enter the shooting standby state as described above.

In shooting standby state, the display control unit 131 reads the digital image signal sequentially stored in the memory 104, and displays a relevant image on the display unit 130. The user can prepare for shooting while monitoring the image displayed on the screen in this way.

When the user operates the moving image recording start button on the operation unit 102 and a shooting start instruction signal is transmitted in the shooting standby state, the control unit 101 transmits a shooting start control signal to each unit of the imaging apparatus 100 to control each unit to perform the following operations.

The imaging unit 110 converts a subject's optical image captured through a lens into an analog image signal by the image sensor, converts the analog image signal to a digital image signal, and sequentially stores the digital image signal in the memory 104. The image processing unit 111 applies the image quality adjustment processing (adjustment of white balance, color, brightness, etc.) to the digital image signal temporarily stored in the memory 104 based on setting values. The display control unit 131 reads the digital image signal having undergone the image adjustment processing stored in the memory 104, and displays a relevant image on the display unit 130.

In the meantime, the audio input unit 120 converts an analog audio signal acquired by the microphone to a digital audio signal, and stores the acquired digital audio signal in the memory 104. The audio processing unit 121 applies level optimization processing to the digital audio signal stored in the memory 104, and outputs the digital audio signal. When compressing the audio signal, the audio processing unit 121 applies compression processing to the audio signal.

Then, the image processing unit 111 and the audio processing unit 121 read the image signal and the audio signal, respectively, which are temporarily stored in the memory 104, and apply predetermined encoding processing to respective signals to generate moving image data and audio data. Then, the control unit 101 combines the moving image data with the audio data to form a data stream, and outputs the data stream to the recording and reproduction unit 140. The recording and reproduction unit 140 writes the data stream to the recording medium 141 as one moving image file under the control of the file system such as the UDF and the FAT.

When the audio signal is not to be compressed, the control unit 101 outputs the audio signal generated by the audio processing unit 121 together with the moving image data generated by the image processing unit 111 to the recording and reproduction unit 140. Then, the recording and reproduction unit 140 writes the data stream to the recording medium 141 as one moving image file under the control of the file system such as the UDF and the FAT, as described above.

The imaging apparatus 101 continues the above-described operations during the shooting operation.

During the shooting operation, the control unit 101 is transmitting various control signals to the imaging unit 110, the image processing unit 111, the audio processing unit 121, etc. in response to a user operation on the operation unit 102 or according to the result of analyzing the image signal generated by the image processing unit 111. For example, the control unit 101 transmits control signals for lens movement and diaphragm adjustment to the imaging unit 110, and control signals for image and audio adjustments to the image processing unit 111 and the audio processing unit 121, respectively.

During the shooting operation, similarly, when the user operates the zoom key on the operation unit 102, the control unit 101 activates an "optical zoom" function of the imaging unit 110 and an "electronic zoom" function of the image processing unit 111. Further, based on an acceleration signal detected by a vibration detection unit (not illustrated), the control unit 101 activates an "optical image stabilization" function of the imaging unit 110 and an "electronic image stabilization" function of the image processing unit 111.

Then, when the user operates the moving image recording end button on the control unit 110 and then a shooting end instruction signal is transmitted to the control unit 101, the control unit 101 transmits a shooting end control signal to each unit of the imaging apparatus 100 to control each unit to perform the following operations.

The image processing unit 111 and the audio processing unit 121 read the remaining image signals and audio signals stored in the memory 104, and apply predetermined encoding processing to these signals to generate moving image data and audio data, respectively.

As the final moving image data and audio data, the control unit 101 forms a data stream and outputs it to the recording and reproduction unit 140. When the audio data is not to be compressed, the control unit 101 outputs the audio data generated by the audio processing unit 121 and the moving image data to the recording and reproduction unit 140.

The recording and reproduction unit 140 writes the data stream to the recording medium 141 as one moving image file under the control of the file system such as the UDF and the FAT. When data stream supply stops, the control unit 101 controls each unit to perform the following operations to generate a thumbnail.

Subsequently, the recording and reproduction unit 140 reads moving image data of a first frame of the moving image file recorded on the recording medium 141, and transmits the moving image data to the image processing unit 111. The image processing unit 111 temporarily stores the moving image data in the memory 104, and decodes the moving image data by predetermined procedures.

Then, the image processing unit 111 applies predetermined encoding processing for thumbnail to the acquired image signal to generate a compressed image signal for thumbnail. Then, the control unit 101 outputs the compressed image signal for thumbnail to the recording and reproduction unit 140. Under the control of the file system such as the UDF and the FAT, the recording and reproduction unit 140 writes the compressed image for thumbnail to the recording medium 141 so as to be combined with the original moving image file to form a moving image file, and stops the recording operation.

When the recording operation stops, the control unit 101 transmits a control signal to each unit of the imaging apparatus 100 to shift to the shooting standby state. Then, the imaging apparatus 100 returns to the shooting standby state.

The reproduction mode will be described below. When the reproduction mode is set on the operation unit 102, the control unit 101 transmits a control signal to each unit of the imaging apparatus 100 to shift to the reproduction state. Each unit performs the following operations.

The recording and reproduction unit 140 reads a still image file including the compressed image signal recorded on the recording medium 141, or a moving image file including the compressed image signal and the compressed audio signal or an uncompressed audio signal recorded thereon. The control unit 101 transmits the read compressed image signal and compressed audio signal to the image processing unit 111 and the audio processing unit 121, respectively. The control unit 101 transmits the uncompressed audio signal to the output unit 150.

The image processing unit 111 and the audio processing unit 121 temporarily store the compressed image signal and the compressed audio signal in the memory 104, respectively, and decode respective signals with predetermined procedures. Then, the control unit 101 transmits the decoded audio signal and the decoded image signal to the output unit 150 and the display control unit 131, respectively.

The display control unit 131 displays an image related to the input image signal on the display unit 130. An audio output line of the output unit 150 outputs sound related to the input audio signal to a built-in speaker, a connected earphone, or a connected speaker.

Figure 2:
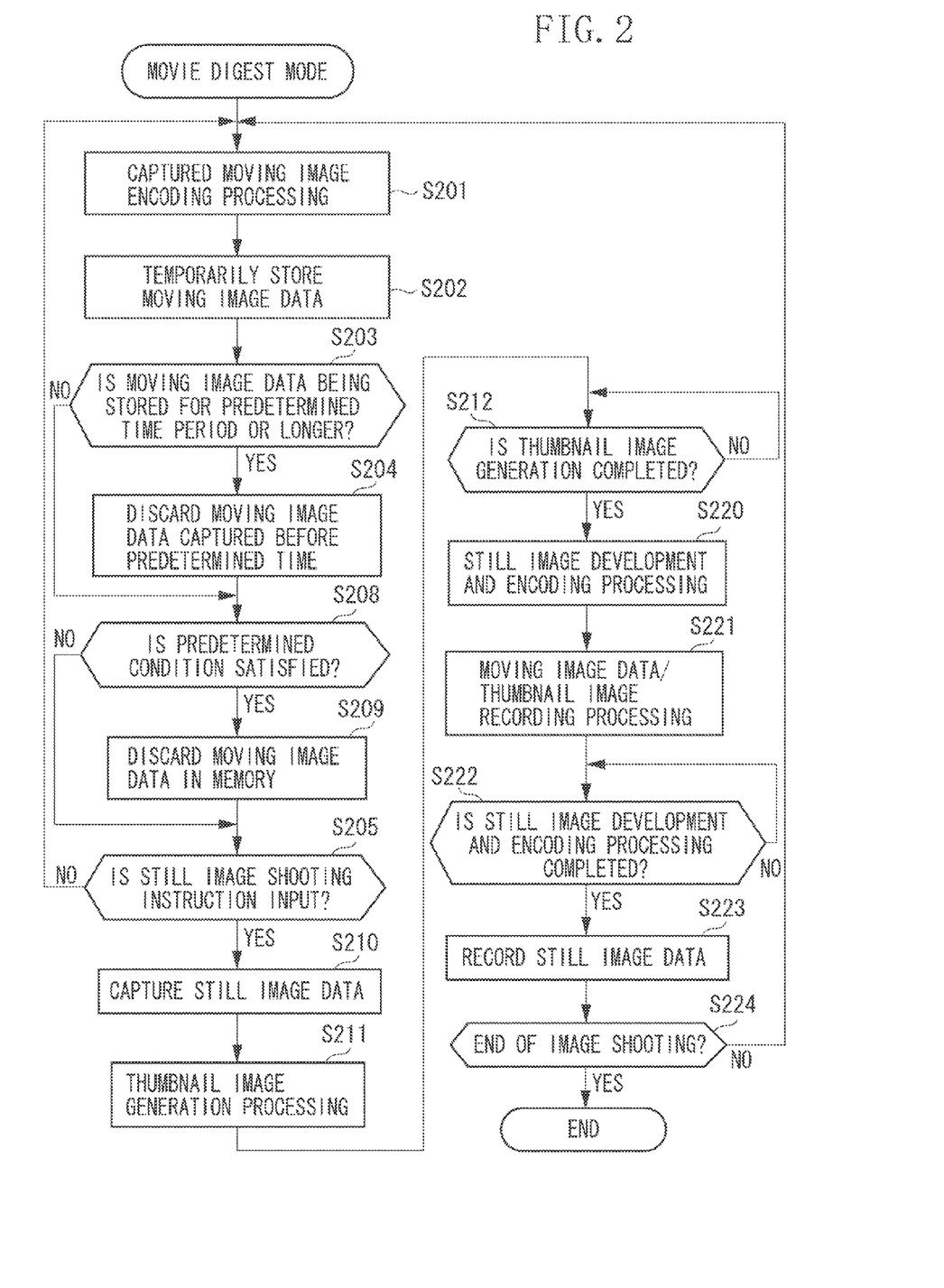
FIG. 2 is a flowchart illustrating control of the imaging apparatus in a digest movie mode.

The "digest movie mode" will be described below with reference to the flowchart in FIG. 2. Processing in the flowchart in FIG. 2 is started when the imaging apparatus 100 is set in the movie digest mode. The control unit 101 controls each unit of the imaging apparatus 100 to execute the processing.

In the present exemplary embodiment, the control unit 101 determines whether the moving image data is to be sequentially connected (added) after the still image recording instruction is input and before the moving image data is recorded on the recording medium 141. The control unit 101 reads from the recording and reproduction unit 140 the moving image file captured last in the movie digest mode, and checks information about the shooting date. If the read moving image file was captured on the current date, the control unit 101 adds the moving image file to the moving image data. Otherwise, if the read moving image file was captured not on the current date, the control unit 101 does not add the moving image file to the moving image data.

A moving image captured in the movie digest mode has a file name composed of, for example, an "MDG" identifier and a four-digit serial integer number which is automatically incremented. The "MDG" identifier indicates that the moving image was captured in the movie digest mode. Such a file name makes it easier to identify that a moving image having a file name composed of the "MDG" identifier and the largest number recorded on the recording medium 141 is captured last. Conditions for adding moving image data will be described below. The control unit 101 may determine whether the moving image data is to be added when the imaging apparatus 100 is activated or when the movie digest mode is selected.

The present exemplary embodiment will be described below on the premise that a thumbnail image is generated each time the still image shooting instruction is input. In this case, a plurality of thumbnail images will be related to the added moving image file. However, a thumbnail image may be generated only when a new moving image file is generated but not generated when the moving image data is added.

When the digest movie mode is set on the operation unit 102, the control unit 101 controls each unit of the imaging apparatus 100 to perform the following operations.

In step S201, the imaging unit 110 first transmits the acquired digital image signal to the memory 104 (i.e., the RAM. 104) for temporary storage. Then, the display control unit 131 reads the digital image signal stored in the RAM 104, and displays a relevant image on the display unit 130. Further, the image processing unit 111 sequentially reads the digital image signal stored in the RAM 104 and applies encoding processing to the digital image signal to generate moving image data.

In this case, the control unit 101 instructs the audio processing unit 121 to apply various types of adjustment processing to the input digital audio signal, applies encoding processing to the audio signal based on a predetermined audio encoding method, and stores the acquired encoded audio signal in the RAM 104.

In step S202, the image processing unit 111 and the audio processing unit 121 respectively store the encoded moving image data and audio data in the RAM 104. The following explanations will be made on the premise that audio data is processed together with moving image data, and descriptions of the audio data will be omitted.

The imaging apparatus 100 according to the present exemplary embodiment deletes the moving image data captured previous to a specified time period among the moving image data pieces stored in the RAM 104 so that only the moving image data of the last predetermined time length is constantly stored in the RAM 104.

Therefore, in step S203, the control unit 101 determines whether the moving image data of the predetermined time length or longer has been stored in the RAM 104. When the control unit 101 determines that moving image data of the predetermined time length or longer has been stored in the RAM 104 (YES in step S203), the processing proceeds to step S204. In step S204, the control unit 101 discards the moving image data captured previous to the specified time period. Since the size of the data to be deleted is determined by an encoding unit, the size of the data to be deleted can be determined as the number of frames or reproducing time according to the encoding method.

When the control unit 101 determines that moving image data of the predetermined time length or longer has not been stored (NO in step S203), the control unit 101 does not discard the moving image data. Although, in the present exemplary embodiment, the predetermined time length may be any time length, the user may select a value, for example, 4 seconds, 6 seconds, 8 seconds, or the like.

In step S208, the control unit 101 determines whether any one of predetermined conditions is satisfied. When the control unit 101 determines that any one of predetermined conditions is satisfied (YES in step S208), the processing proceeds to step S209. In step S209, the control unit 101 discards the moving image data temporarily stored in the RAM 104. The predetermined conditions will be summarized below.

For example, a state where an external audio input unit is attached to the audio input unit 120, or a state where an external flash unit is connected to a connection terminal (not illustrated) is regarded as a predetermined condition. A state where an external output cable or a speaker cable (a speaker) is connected to a terminal of the output unit 150 is also regarded as a predetermined condition. Further, not only the connection but also the disconnection may be regarded as a predetermined condition.

More specifically, the attachment and detachment of an external cable or an external apparatus to/from an external input terminal, an external output terminal, and a communication terminal of the imaging apparatus 101 are regarded as one of the predetermined condition. While such a cable or apparatus is being attached or detached, the user may change an orientation or an angle of the imaging apparatus 101 or connection sound occurs from the cable or the apparatus, and therefore moving image data unsuitable for recording may be recorded.

Further, a state where the communication unit 151 establishes communication with an external device is regarded as a predetermined condition. Under such a situation, the user may be performing a certain operation such as an operation of a PC application and therefore not operating the imaging apparatus 100. In the meantime, the user may not adjust the view angle and therefore moving image data having an unsuitable view angle and inclination may be recorded.

In step S209, in such a case, the imaging apparatus 100 according to the present exemplary embodiment discards the moving image data temporarily stored in the RAM 104.

A state where a menu screen for changing the settings of the imaging apparatus 100 is displayed in response to an instruction from the operation unit 102 is also regarded as a predetermined condition. When moving image data is stored in the RAM 104 while the menu screen is displayed, a state where the menu screen mode is exited or a setting change is applied may be regarded as a predetermined condition. In such a case, since it is likely that the user is concentrating on checking of the menu screen rather than checking of the view angle, moving image data without adjusting the view angle will be acquired.

In step S209, in such a case, the imaging apparatus 100 according to the present exemplary embodiment discards the moving image data temporarily stored in the RAM 104.

A state where the imaging apparatus 100 detects that it is inclined by a predetermined angle or more may be regarded as a predetermined condition. The imaging apparatus 100 can determine, at the time of shooting, that it is inclined by a predetermined angle or more, for example, by using a result of detection by a vertical and horizontal detection sensor or an acceleration sensor (not illustrated) provided therein to add to a still image a flag for indicating a vertical or horizontal image. For example, when the user holds the imaging apparatus 100 intending to shoot a horizontally long image (horizontal image) and then changes the camera position intending to shoot a vertically long image (vertical image), any one of the predetermined conditions is determined to be satisfied. In step S209, when the result of detection by an angle detection unit (not illustrated) changes, the imaging apparatus 100 discards the moving image data stored in the RAM 104.

Although the imaging apparatus 100 has only to be able to detect a change in the angle from the vertical image shooting orientation to the horizontal image shooting orientation, the imaging apparatus 100 may discard the moving image data stored in the RAM 104 when the imaging apparatus 100 detects that it is inclined by 45 degrees or more. The result of detection by the angle detection unit is used as a flag for indicating a still image shooting angle which is recorded in associated with the still image, as described above.

The user does not return to the framing operation for a while after the above-described conditions are satisfied. Therefore, the control unit 101 may control each unit to continue discarding the moving image data temporarily stored in the RAM 104 until a predetermined time period has elapsed since these conditions are satisfied.

Although the present exemplary embodiment is described based on a case where the moving image data stored in the RAM 104 is discarded in step S209, the control unit 101 may control each unit not to record the moving image data on the recording medium 141 even without discarding the moving image data in the RAM 104.

States recognized as the predetermined condition are summarized: a state where an external device is attached or detached to/from the imaging apparatus 100, a state where the above-described moving image data recording apparatus rotates by a predetermined angle or more, and a state where a screen for changing the settings of the moving image data recording apparatus is displayed.

In step S205, the control unit 101 determines whether the still image shooting instruction is input from the operational input unit 112. IF the still image shooting instruction is not input (NO in step S205), the processing returns to step S201 to continue the processing for generating and temporarily storing moving image data.

Although the present exemplary embodiment is described below on the premise that moving image data of the last predetermined time length is constantly stored in the RAM 104, the embodiment of the present invention is not limited thereto. More specifically, it is preferable that the size of the moving image data to be stored in the RAM 104 is quantitatively determined. For example, the size may be predetermined by the number of frames, the number of group of pictures (GOPs), or the data size.

More specifically, when the size of the moving image data stored in the RAM 104 reaches a predetermined value, frames of moving image data may be sequentially deleted from the RAM 104, starting from a frame having the oldest shooting time, until the size of the moving image data stored therein falls below the predetermined value.

When the still image shooting instruction is input (YES in step S205), the control unit 101 may control the recording and reproduction unit 140 to check the maximum recordable capacity of the recording medium 141 to determine whether the moving image data temporarily stored in the memory 104 can be recorded on the recording medium 141.

This determination is made by determining whether the sum of the size of the moving image data temporarily stored in the memory 104 and an estimated size of the still image data to be recorded is smaller than the maximum recordable capacity of the recording medium 141. The estimated size of the still image data may be fixed, for example, to 4 MB or changed according to the recording size and the image quality.

When the control unit 101 determines that the moving image data and the still image data cannot be recorded on the recording medium 141, only still image shooting may be performed without recording the moving image data.

When the still image shooting instruction is input (YES in step S205), if only moving image data for a short time length, for example, less than one second or less than two seconds, is stored in the memory 104, the still image shooting instruction may be invalidated. This short time length may be set by the user.

When the still image shooting instruction is input (YES in step S205), the processing proceeds to step S210. In step S210, the control unit 101 instructs the imaging unit 110 to capture still image data.

In step S211, in parallel with the above-described operation, the control unit 101 instructs the image processing unit 111 to decode the image of the first frame of the moving image data stored in the RAM 104, and perform thumbnail image generation processing. Although the present exemplary embodiment is described on the premise that a thumbnail image of the moving image data to be recorded is generated from the image of the first frame, the embodiment of the present invention is not limited thereto. A thumbnail image may be generated from an image of any one frame of the moving image data to be recorded.

More specifically, when the still image shooting instruction is input, a thumbnail image may be generated using any one frame of the moving image data stored in the RAM 104. Accordingly, a thumbnail of moving image data can be generated without reading a moving image file from the recording medium after completion of the moving image data recording thereon, resulting in improved processing speed. When the control unit 101 determines that the still image shooting instruction is input, the control unit 101 controls each unit not to further accept the still image shooting instruction.

In step S212, the control unit 101 determines whether the image processing unit 111 completes the thumbnail image generation processing. When the image processing unit 111 completes the thumbnail image generation processing (YES in step S212), the processing proceeds to step S220. In step S220, the control unit 101 instructs the image processing unit 111 to sequentially apply the development processing and the encoding processing to the digital image signal captured in step S210 to convert it into still image data.

In step S221, in parallel with the above-described operation, the control unit 101 includes the thumbnail image generated by the thumbnail generation processing in the header information of the encoded moving image data temporarily stored in the RAM 104, and records the moving image data on the recording medium 141.

The still image development processing in step S220 includes the "demosaic" processing. The "demosaic" processing collects insufficient color information for each pixel from pixels therearound to complement color information and forms a full-color image at the time of shooting. The still image development processing may also include the gamma correction and white balance adjustment processing.

Upon completion of the above-described development processing, the control unit 101 stores again the developed digital image data in the RAM 104, and instructs the display control unit 131 to read the digital image data therefrom and display a relevant image on the display unit 130. This operation is what is referred to as "Rec review" display for a digital camera with which a captured image is displayed on the display unit 130 immediately after shooting.

The display unit 130 displays no image (black screen) since the time when the still image shooting instruction is input until the time when the still image development processing is completed. Instead, such a message as "Processing in progress" may be displayed to notify the user of the current status.

Upon completion of the development processing, the control unit 101 instructs the image processing unit 111 to perform the encoding processing based on a predetermined encoding method for still image recording.

In step S222, the control unit 101 determines whether the development processing and the encoding processing of the still image are completed. When the control unit 101 determines that the still image development and encoding processing are completed (YES in step S222), the processing proceeds to step S223. In step S223, the control unit 101 transmits the generated still image data to the recording and reproduction unit 140 and records the still image data on the recording medium 141.

In step S224, the control unit 101 determines whether the user operates the operational unit 102 to exit the digest movie mode. When the digest movie mode is not to be ended (NO in step S224), the processing returns to step S201. In step S201, in parallel with the still image recording, the control unit 101 starts moving image shooting and encoding processing. In this case, the control unit 101 instructs the display control unit 131 to read the digital image signal stored in the RAM 104 and display a through image again on the display unit 130.

As described above, the imaging apparatus 100 according to the present exemplary embodiment records a moving image file and a still image file in the "digest movie mode."

A case where, in the "digest movie mode" according to the present exemplary embodiment, newly captured moving image data (new moving image data) is connected (added) to the moving image data of the moving image file already recorded on the recording medium 141 (existing moving image file) will be described below.

Figure 3:
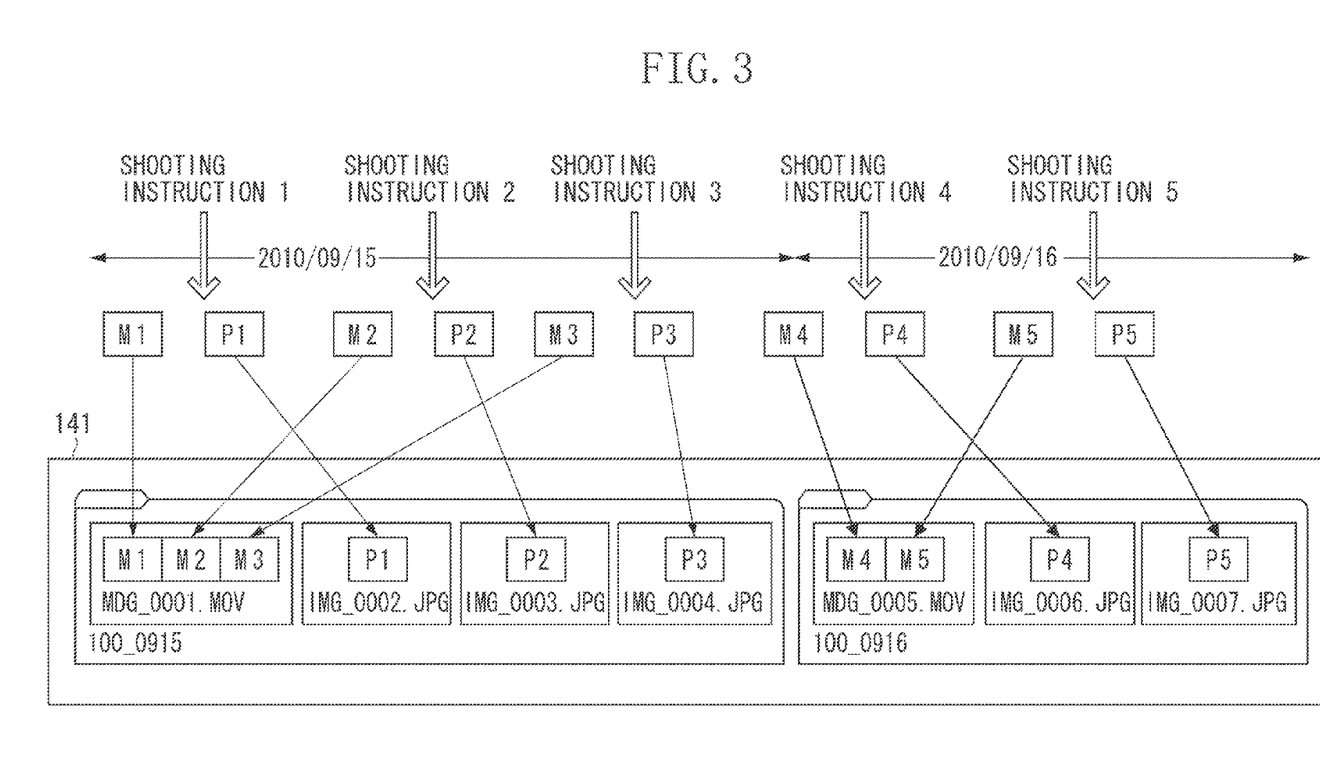
FIG. 3 illustrates states of still image and moving image files which are recorded in the movie digest mode.

For example, if it is assumed that moving image data pieces are connected when the recording date of the existing moving image file coincides with the acquisition date of the new moving image data (or the date setting of a camera at the time of shooting), moving image files and still image files are recorded as illustrated in FIG. 3. FIG. 3 illustrates shooting timings and recording states of moving image files and still image files.

Still image files P1, P2, and P3 having the same shooting date are recorded in the same single folder on the recording medium 141. Moving image data pieces M1, M2, and M3 stored in the RAM 104 immediately before shooting each still image are recorded as one connected moving image file in the same folder.

Still image files P4 and P5 having a different shooting date from the still image files P1 to P3 are recorded in a different folder from the one in which the still image file P1 is recorded. In this case, even if the shooting date is changed in the middle of moving image data M4 stored in the RAM 104 immediately before shooting the still image file P4, the control unit 101 performs control to record the moving image data M4 in the folder for the shooting date of the still image file P4. In other words, the control unit 101 determines whether the moving image data is to be connected or newly stored according to date information at the timing when a shooting instruction is input.

Although the present exemplary embodiment is described on the premise that a thumbnail image corresponding to the moving image data is generated each time the still image shooting instruction is input, the generation of a thumbnail is not limited thereto. For example, it is possible that a thumbnail image is generated for the moving image data M1, which is generated when still image data of the still image file P1 is captured, but not generated for the moving image data pieces M2 and M3 to be added. Thus, one thumbnail image can be generated for each moving image file.

Processing for connecting (adding) newly captured moving image data (new moving image data) to the moving image data of a moving image file already recorded on the recording medium 141 (existing moving image file) in the "digest movie mode" will be described in detail below. As described above, the control unit 101 determines whether the moving image data is to be connected (added) when the imaging apparatus 100 is activated, the digest movie mode is selected, or the still image recording instruction is input.

Although the moving image data connection processing is executed in step S221 in FIG. 2, a part of the processing may be executed in parallel with steps S222, S223, and S201 to S204, as described below.

Figure 4:
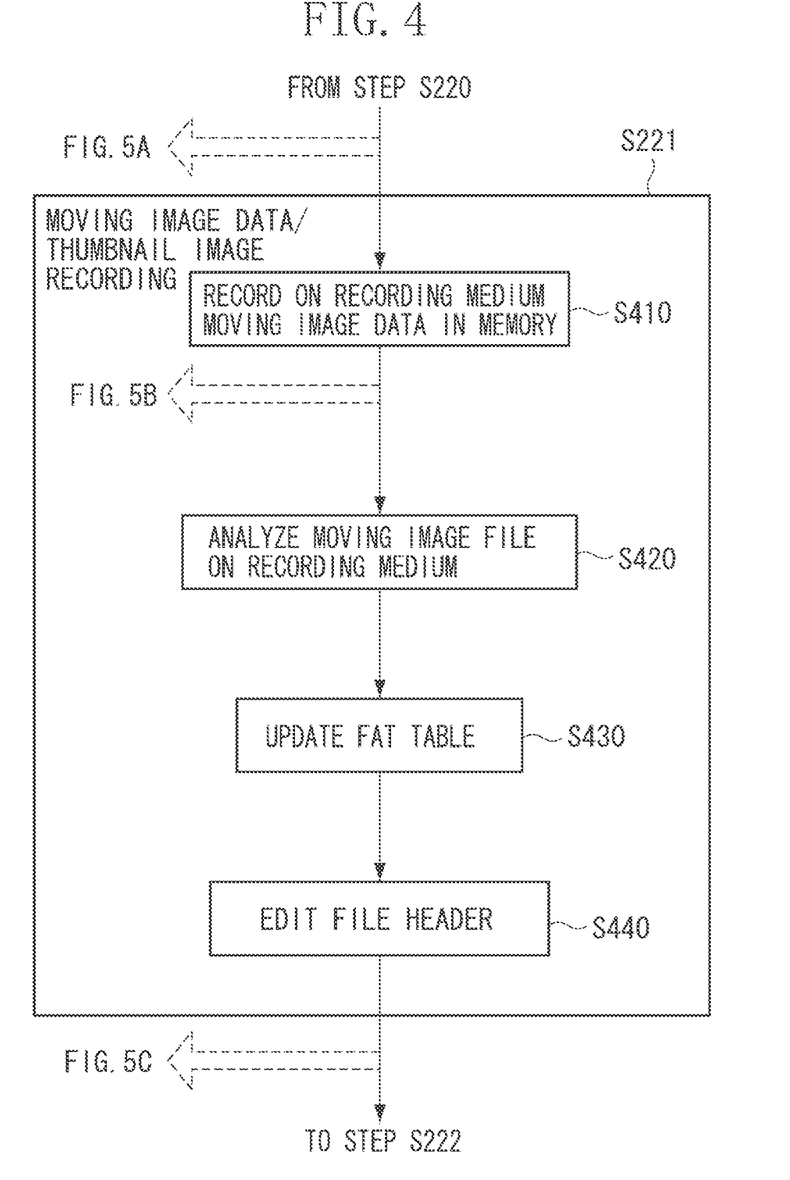
FIG. 4 is a flowchart illustrating control processing for connecting (adding) moving image data pieces.
Figure 5A:
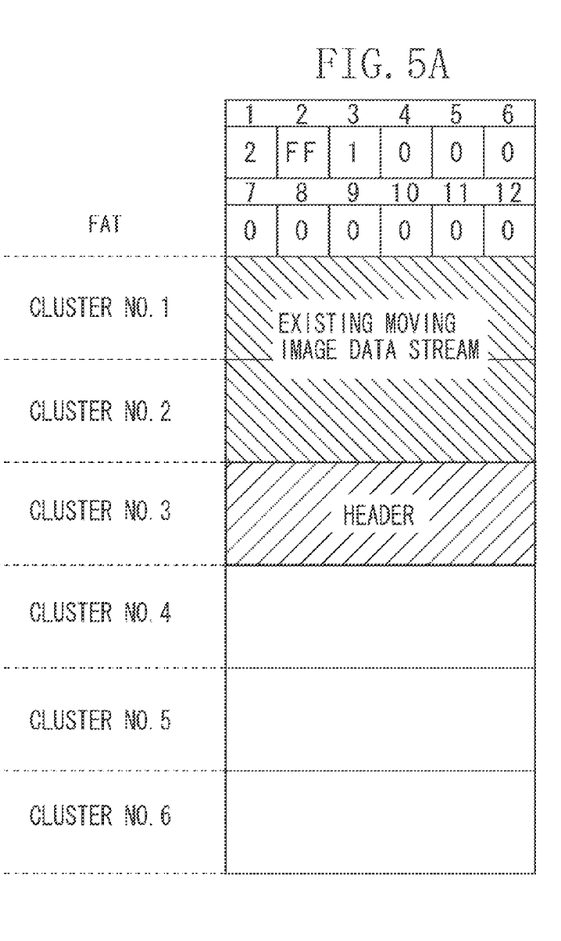
FIGS. 5A to 5C illustrate state transitions of a moving image file by the connection (addition) of moving image data pieces.
Figure 5B:
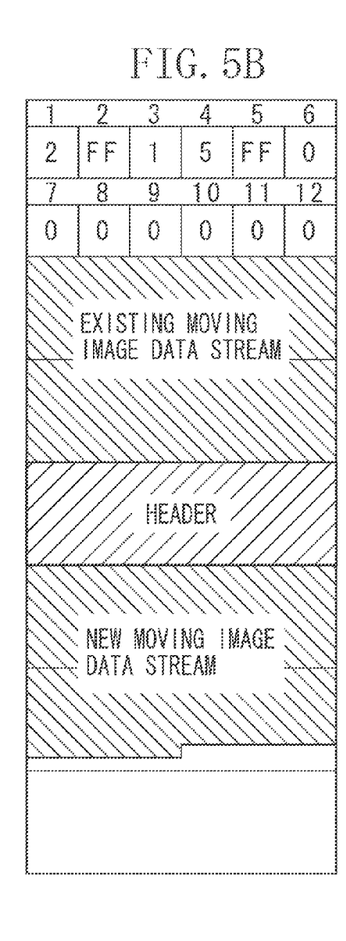
Figure 5C:
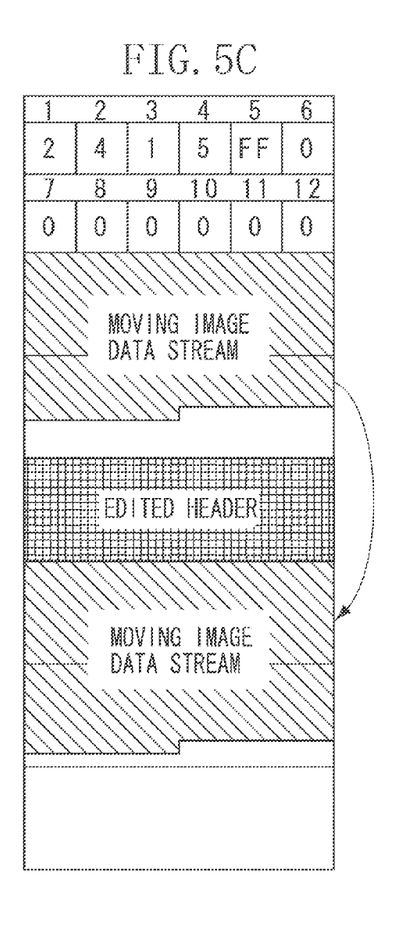

FIG. 4 illustrates control operations performed by the imaging apparatus 100 to connect (add) the moving image data. FIGS. 5A, 5B, and 5C each illustrate a state of a moving image file in the recording medium 141, corresponding to each step in FIG. 4. The processing in FIG. 4 is executed when the control unit 101 controls each unit of the imaging apparatus 100.

In step S410, the control unit 101 first controls the recording and reproduction unit 140 to record in a free area on the recording medium 141 the moving image data of the predetermined time length stored in the memory 104 in step S202. Since the FAT is used as the file system, the control unit 101 records the moving image data in empty clusters based on a basic rule.

FIG. 5A illustrates a recording state of a specific moving image file on the recording medium 141 before the moving image data in the memory 104 is recorded on the recording medium 141. Referring to FIG. 5A, the moving image data of the specific moving image file is recorded in clusters 1 to 2, and a header of the specific moving image file is recorded in a cluster 3. The moving image file is recorded in the clusters 1 to 3 in this way.

Then, the cluster numbers are recorded in the FAT entry to indicate that the file data pieces are recorded in the FAT area in order of cluster numbers 3, 1, and 2. More specifically, "1" is recorded in the FAT entry of the cluster number 3, "2" is recorded in the FAT entry of the cluster number 1, and "FF" indicating the end of file is recorded in the FAT entry of the cluster number 2. Therefore, the specific moving image file can be read from the recording medium 141 by reading clusters in order of cluster numbers 3, 1, and 2.

FIG. 5B illustrates a recording state on the recording medium 141 after the moving image data of the predetermined time length stored in the memory 104 in step S410 is recorded on the recording medium 141. FIG. 5B illustrates a recording state on the recording medium 141 after the moving image data of the predetermined time length is recorded in clusters 4 and 5. In this state, as illustrated by the FAT entry in the FAT area, the moving image data of the predetermined time length is recorded in the clusters 4 and 5 and is different from the specific moving image file recorded in the clusters 1 to 3.

Processing in step S420 will be described below. Once the processing in step S410 is started, the processing in step S420 can be started even if the processing in step S410 is not completed.

After the moving image data of the predetermined time length stored in the memory 104 is started being recorded, the control unit 101 analyzes the moving image data of the specific moving image file recorded on the recording medium 141 to identify a connecting position. In the present exemplary embodiment, the connecting position is set after the moving image data of the specific moving image file. In this processing, if the specific moving image file has a large size, reading and analyzing take a long time, and accordingly identifying a connecting position also takes a longer time.

In step S430, the control unit 101 controls the recording and reproduction unit 140 to update the FAT entry so as to connect (add) the moving image data of the predetermined time length recorded on the recording medium 141 to the specific moving image file. More specifically, as illustrated in FIG. 5C, the recording and reproduction unit 140 changes a state where the end of the specific moving image file is the cluster number 2 by correcting the FAT entry so that clusters 4 and 5 are read immediately after the cluster 2. More specifically, the recording and reproduction unit 140 updates the FAT entry of the cluster number 2 of the FAT from "FF" indicating the end of file to "4" so that the cluster 4, the start of the clusters in which new moving image data is recorded, is to be read.

In step S440, the control unit 101 reads the file header of the specific moving image file, edits the file header to add management information for new moving image data thereto, and records the file header on the recording medium 141. Such management information indicating which data in the moving image file corresponds to a starting position of a specific frame or specific GOP of the moving image will be recorded on the file header. FIG. 5C illustrates a recording state of the moving image file after completion of the above-described connection processing. The moving image file is composed of the cluster 1 to 5 recorded in order of the cluster number 3, 1, 2, 4, and 5. Then, the control unit 101 transfers control to step S222.

The processing in steps S420 to S440 may be executed in parallel with the processing in steps S222 and S223. Further, processing for temporarily storing the moving image data by the next shooting may be executed in parallel with the processing in steps S201 to S204. This is because, after completion of the processing in step S410, the moving image data stored in the memory 104 has already been recorded on the recording medium 141, and therefore the area of the memory 104 for temporarily storing moving image data is released. Once the area for temporarily storing the moving image data in the memory 104 is released, it becomes possible to start storing in the memory 104 the moving image data acquired in step S201.

In step S410, in response to an input of the shooting instruction, the control unit 101 of the imaging apparatus 100 according to the present exemplary embodiment controls the recording and reproduction unit 140 to record on the recording medium 141 the moving image data of the predetermined time length stored in the memory 104 before the shooting instruction is input. In step S420, after recording of the moving image data of the predetermined time length stored in the memory 104 is started, the control unit 101 analyzes the moving image data of the specific moving image file recorded on the recording medium 141 to identify a connecting position. Subsequently, the control unit 101 edits the FAT and header to edit the above-described specific moving image file so that the moving image data of the predetermined time length may be reproduced following the connecting position.

When connecting newly captured moving image data to the moving image data of an existing moving image file recorded on the recording medium 141, the imaging apparatus 100 according to the present exemplary embodiment can record on the recording medium 141 the new moving image data temporarily stored in the RAM 104 to release the moving image data storage area in the memory 104 before analyzing a connecting position of the existing moving image file. Accordingly, since it becomes possible to store the following moving image data in the moving image data storage area in the memory 104 before specifying the connecting position of the existing moving image file, the imaging apparatus can become ready for capturing next moving image data without taking a long time.

As described above, in response to an input of the recording instruction, the control unit 101 of the imaging apparatus 100 according to the present exemplary embodiment records on the recording medium 141 the moving image data temporarily stored in the RAM 104 before the recording instruction is input.

On the other hand, if any one of the predetermined conditions is satisfied before the recording instruction is input, the control unit 101 discards the moving image data temporarily stored in the RAM 104. With the above-described predetermined conditions, the moving image data temporarily stored in the RAM 104 is likely to be unsuitable for recording. The predetermined conditions include, for example, the attachment and detachment of an apparatus or cable to/from an input/output terminal, the rotation of the imaging apparatus 100, and menu screen display. The imaging apparatus 100 according to the present exemplary embodiment can automatically prevent the moving image data unsuitable for recording from being recorded on the recording medium 141 by discarding the moving image data temporarily stored in the RAM 104 based on such predetermined conditions.

Although the present exemplary embodiment is described based on a case where the moving image data temporarily stored in the RAM 104 is discarded, the embodiment is not limited thereto. For example, information about a timing satisfying the predetermined conditions is stored in the RAM 104, and the imaging apparatus 100 may perform control so as not to record the moving image data captured before that timing on the recording medium 141.

Although the imaging apparatus 100 according to the present exemplary embodiment basically adds new moving image data to the moving image data of the existing moving image file, the addition is not performed when any one of the following conditions is satisfied.

When the existing moving image file subjected to addition is protected

When a specific moving image file "MDG_000X.MOV" recorded on the recording medium 141 is protected, it is likely that the user does not want to modify the file, and therefore the addition is determined to be impossible.

When the file size exceeds a predetermined size after additional shooting

The recording medium 141 is managed by the FAT file system, as described above. In this case, for example, FAT32 cannot read a file having a size of 4 GB or more. Therefore, the addition is determined to be impossible if the size of "moving image file after addition" exceeds 4 GB after the next shooting.

When the GOP structure of the moving image of the existing moving image file subjected to addition is defective If the GOP structure is found to be defective as a result of checking a specific moving image file "MDG_000X.MOV" subjected to addition recorded on the recording medium 141, the moving image data to be added may be affected and therefore the addition is determined to be impossible.

When there is no existing moving image file subjected to addition

A moving image captured in the digest movie mode is assigned a file name "MDG_000X.MOV" which is composed of the "MDG" identifier and a 4-digit serial number. However, if there is no moving image having a file name including the "MDG" identifier, no moving image file captured in the digest movie mode exists and therefore the addition is determined to be impossible. The file name of the moving image file last recorded in the digest movie mode is recorded in a nonvolatile memory (not illustrated) of the imaging apparatus 100. When the file does not exist, the addition is determined to be impossible.

When the shooting date of the existing moving image file subjected to addition differs from the date setting in the imaging apparatus If moving image data captured on the same shooting date in the digest movie mode is sequentially added to, another moving image file will be recorded when the date is changed and therefore the addition is determined to be impossible.

When a region setting related to the existing moving image file subjected to addition is different from the region setting in the imaging apparatus If moving image data captured in the same region in the digest movie mode is sequentially added to, another moving image file will be recorded when the region is changed and therefore the addition is determined to be impossible. For example, the region information may be positional information acquired by a global positioning system (GPS) unit or the "country" information selected when clock setting is made on the imaging apparatus 100.

When information about the imaging apparatus related to the existing moving image file subjected to addition is different from that of the imaging apparatus for capturing new moving image data If only moving image data captured in the digest movie mode with an identical imaging apparatus is added to, the control unit 101 determines whether the identification information of the imaging apparatus related to the existing moving image file subjected to addition recorded on the recording medium coincides with that of the imaging apparatus for capturing image data. When the two pieces of identification information are different, the addition is determined to be impossible.

When moving image recording setting does not coincide with that of the existing moving image file subjected to addition If new moving image data is added to the existing moving image file as in the present exemplary embodiment, changing the frame rate, image size, GOP configuration, or moving image encoding method in the middle of the moving image may disable seamless reproduction. Therefore, when the moving image recording setting of the moving image data of the existing moving image file does not coincide with that of the new moving image data, the addition is determined to be impossible. Information such as the frame rate, image size, GOP configuration, and moving image encoding method is recorded on the file header of the existing moving image file.

When the audio recording setting does not coincide with that of the existing moving image file subjected to addition If new moving image data is added to the existing moving image file as in the present exemplary embodiment, changing the audio sampling rate, the number of channels, bit depth, or audio encoding method in the middle of the moving image may disable reproduction. Therefore, when the audio recording setting of the moving image data of the existing moving image file does not coincide with that of the new moving image data file, the addition is determined to be impossible. Information such as the audio sampling rate and audio encoding method is recorded on the file header of the existing moving image file.

When an insertion/removal history of the recording medium 141 remains in memory When the imaging apparatus 100 is activated, if a history of insertion/removal of the recording medium 141 after the last shooting in the continuous moving image shooting mode remains in a nonvolatile memory (not illustrated), the addition is determined to be impossible. This reduces the possibility that the moving image file "MDG_000X.MOV" recorded on the recording medium 141 is edited by a computer, the image size is changed, and then the moving image file itself is destroyed by the addition. Accordingly, the control unit 101 compares the shooting date information recorded on the file header of the existing file "MDG_000X.MOV" subjected to addition with the time information of the insertion/removal history remaining in the nonvolatile memory. With the added moving image file "MDG_000X.MOV", information about the first shooting time of the moving image data of a plurality of recorded scenes is recorded in the file header.

When the moving image reproduction time exceeds a predetermined time length after addition shooting With the imaging apparatus 100, in consideration of a case where the user does not want to shoot exceeding a predetermined time length (for example, 30 minutes), if the reproducing time of the moving image data of the "moving image file after addition" exceeds 30 minutes by newly shooting a moving image in the continuous moving image shooting mode, the addition is determined to be impossible. Accordingly, if the read reproducing time of the "moving image file after addition" recorded in the file header is, for example, 29 minutes and 58 seconds, the addition is determined to be impossible.

When the number of files in a folder storing the existing moving image file subjected to addition is equal to or greater than a predetermined number The imaging apparatus 100 records the number of still image files and moving image files to be recorded on the recording medium 141 based on a standard referred to as the design rule for camera file system (DCF). The DCF standard prescribes that up to 9999 files can be recorded in one folder. However, in the present exemplary embodiment, a new still image file is generated when shooting is made and therefore the still image file may not be recorded in a folder storing the existing moving image file subjected to addition. In this case, the related still image file and the existing moving image file subjected to addition are stored in different folders, making it difficult for the user to view the moving image afterwards. In such a case, therefore, the moving image is recorded as a new file in a new folder, not added to the existing moving image data. Although the maximum number of files is described as 9999, it may be 999, 900, or 100.

If the recording medium 141 or the existing moving image file is defective and normal check is not possible, the addition is determined to be impossible.

The present exemplary embodiment is described based on an imaging apparatus. The imaging apparatus may include a general compact digital camera, a digital single-lens reflex camera, a video camera, and a mobile phone. The technique according to the present invention is applicable not only to an imaging apparatus but also to a personal computer to which a camera is connected.

The above-described exemplary embodiment can also be implemented by software on a computer (or CPU, MPU, etc.) included in a system or an apparatus. Therefore, to implement the above-described exemplary embodiment by the computer, a computer program supplied to the computer also achieves the present invention. More specifically, the computer program for implementing the functions of the above-described exemplary embodiment is also a part of the present invention.

The computer program for achieving the above-described exemplary embodiment is provided in any form as long as it can be read by a computer. For example, the computer program may be an object code, an interpreter-executable program, or script data supplied to an operating system (OS). However, the form of the computer program is not limited thereto. The computer program for achieving the above-described exemplary embodiment can be supplied to a computer via a storage medium or wired/wireless communication. A storage medium for supplying the program may include, for example, a magnetic storage medium such as a flexible disk, a hard disk, and a magnetic tape, an optical/magneto-optical storage medium such as a magneto-optical disc (MO), a CD, and a DVD, or a nonvolatile semiconductor memory.

The computer program is supplied via wired/wireless communication, for example, by a server on a computer network. In this case, a data file (program file) serving as a computer program achieving the present invention is stored in the server. The program file may be either an executable code or a source code.

The computer program can be supplied as a program file downloaded to a client's computer which accesses the server. In this case, it is also possible to divide the program file into a plurality of segment files which are distributed to different servers. More specifically, the server apparatus for providing the client's computer with the program file for achieving the above-described exemplary embodiment is also a part of the present invention.

It is also possible to encrypt the computer program for achieving the above-described exemplary embodiment, distribute a storage medium storing the encrypted computer program, supply key information for decryption to a user who satisfies a predetermined condition, and permits installation of the program on a computer of the user. The key information can be supplied to the user, for example, by downloading it from a homepage through the Internet.

The computer program for achieving the above-described exemplary embodiment may use functions of the OS operating on a computer. The computer program for achieving the above-described exemplary embodiment may partly be configured by firmware such as an extension board installed in a computer, and may be executed by a CPU included in the expansion board.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-020643 filed Feb. 2, 2011, which is hereby incorporated by reference herein in its entirety.

What is claimed is:

1. A moving image data recording apparatus comprising:
   an acquisition unit configured to acquire moving image data;
   a recorder configured to record, on a recording medium, moving image data; and
   a controller configured to, in response to an input of a recording instruction, perform control to record, on the recording medium, moving image data for a predetermined time length acquired by the acquisition unit before the input of the recording instruction,
   wherein, if the moving image data recording apparatus is rotated by a predetermined angle or larger before the input of the recording instruction, the controller is configured to perform control not to record moving image data acquired before the moving image data recording apparatus is rotated by the predetermined angle or larger out of the moving image data for the predetermined time length, and to perform control to record moving image data acquired after the moving image data recording apparatus is rotated by the predetermined angle or larger out of the moving image data for the predetermined time length.

2. The moving image data recording apparatus according to claim 1, further comprising:
   a memory configured to temporarily store moving image data of at least the predetermined time length acquired by the acquisition unit,
   wherein in response to the input of the recording instruction, the controller performs control to record the moving image data of the predetermined time length temporarily stored in the memory, and
   wherein the controller deletes the moving image data temporarily stored, in the memory, before the moving image data recording apparatus is rotated by the predetermined angle or larger.

3. The moving image data recording apparatus according to claim 1, further comprising:
   a memory configured to temporarily store moving image data of at least the predetermined time length acquired by the acquisition unit,
   wherein in response to the input of the recording instruction, the controller performs control to record the moving image data of the predetermined time length temporarily stored in the memory, and
   wherein the controller performs control not to record, on the recording medium, the moving image data which has been temporarily stored, in the memory, before the moving image data recording apparatus is rotated by the predetermined angle or larger, even though the moving image data is temporarily stored in the memory before the input of the recording instruction.

4. The moving image data recording apparatus according to claim 1, further comprising:
   a still image data acquisition unit configured to acquire still image data,
   wherein the controller performs control to record, on the recording medium, the still image data acquired by the still image data acquisition unit and the moving image data acquired by the acquisition unit in response to the input of the recording instruction.

5. The moving image data recording apparatus according to claim 1, wherein the controller performs control to record a plurality of pieces of the moving image data each corresponding to a different one of a plurality of recording instructions, as one moving image file.

6. The moving image data recording apparatus according to claim 5, wherein the controller performs control to record the plurality of pieces of the moving image data captured at a same day as one moving image file.

7. The moving image data recording apparatus according to claim 5, wherein the controller performs control to record moving image data captured at different days, as different files.

8. The moving image data recording apparatus according to claim 1 further comprising:
an imaging unit,
wherein the acquisition unit acquires moving image data obtained by the imaging unit.

9. The moving image data recording apparatus according to claim 1, further comprising:
an imaging unit; and
a still image acquisition unit configured to, in response to an input of a still image recording instruction, acquire still image data obtained by the imaging unit,
wherein the acquisition unit acquires moving image data obtained by the imaging unit, and
wherein the controller performs control, in response to the input of the still image recording instruction, to record, on the recording medium, the still image data acquired by the still image acquisition unit and the moving image data acquired by the acquisition unit before the input of the still image recording instruction.

10. A method for controlling a moving image data recording apparatus comprising:
acquiring moving image data, performing control, in response to an input of a recording instruction, to record, on a recording medium, moving image data for a predetermined time length acquired before the input of the recording instruction;
wherein if the moving image data recording apparatus is rotated by a predetermined angle or larger before the input of the recording instruction, performing control not to record moving image data acquired before the moving image data recording apparatus is rotated by the predetermined angle or larger out of the moving image data for the predetermined time length, and to perform control to record moving image data acquired after the moving image data recording apparatus is rotated by the predetermined angle or larger out of the moving image data for the predetermined time length.

11. A non-transitory computer-readable storage medium storing a program that causes a computer to execute the method according to claim 10.

* * * * *